United States Patent Office 3,252,882
Patented May 24, 1966

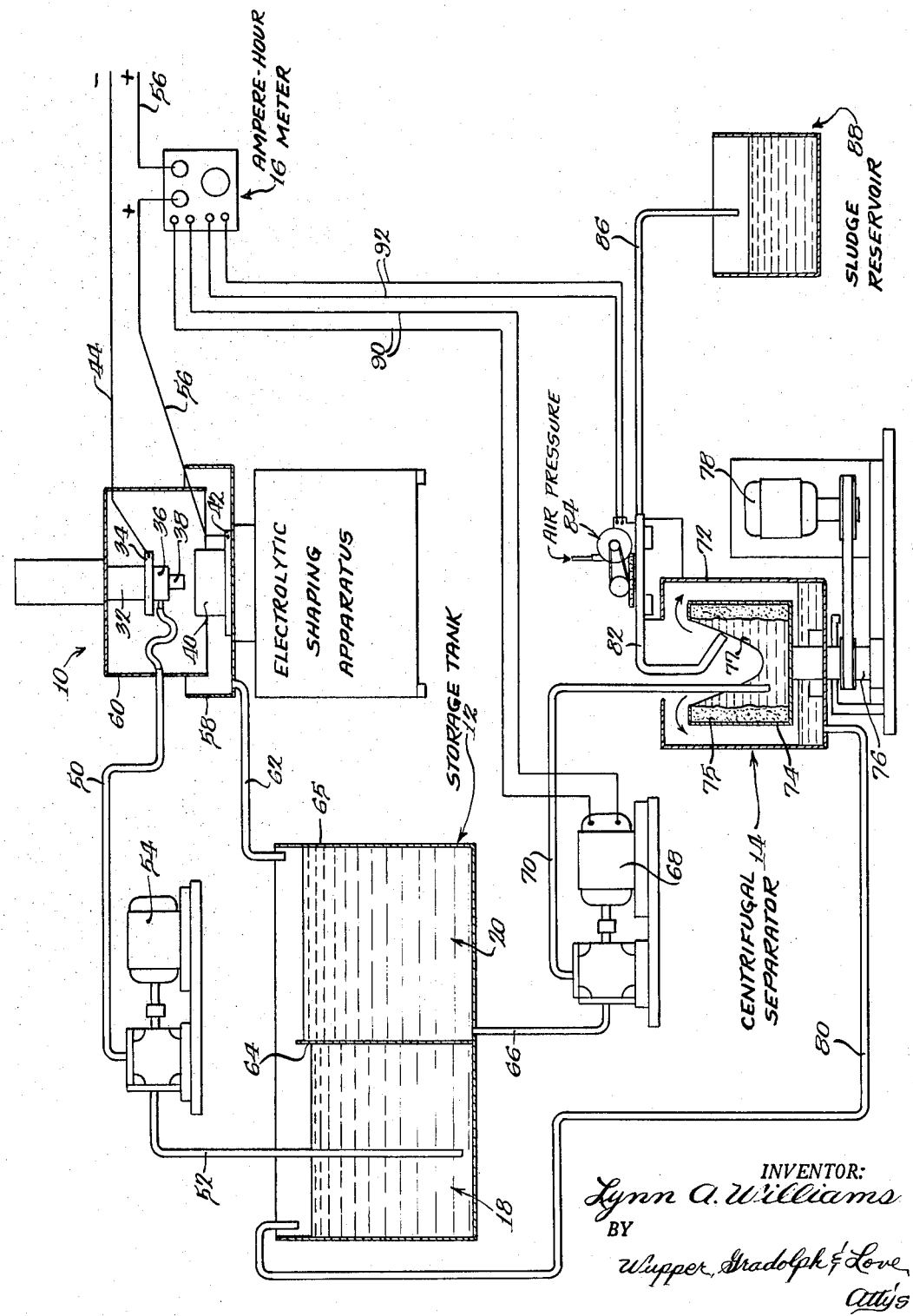

3,252,882
APPARATUS FOR REMOVING SLUDGE FORMED DURING ELECTROLYTIC SHAPING AND CAVITY SINKING FROM CONTAMINATED ELECTROLYTE
Lynn A. Williams, Winnetka, Ill., assignor to Anocut Engineering Company, Chicago, Ill., a corporation of Illinois
Filed June 11, 1962, Ser. No. 201,352
4 Claims. (Cl. 204—224)

This invention relates to an electrolytic shaping and cavity sinking process and system, and particularly to an automatic arrangement for removing sludge formed during electrolytic shaping and cavity sinking from contaminated electrolyte.

It has been discovered that electrochemically erodible workpieces can be shaped with electrodes by simultaneously pumping electrolyte through the interspace or work gap between the electrode and the workpiece under appreciable pressure, and passing a low potential, high density current between the electrode and the workpiece in a sense to make the latter anodic. The method and apparatus for practicing such shaping and cavity sinking are described in applicant's copending applications Serial No. 772,960, filed October 10, 1958, issued into Patent No. 3,058,895, dated October 16, 1962, Serial No. 73,154, filed September 2, 1960, and others.

In such electrolytic shaping, particularly when common salt water is employed as the electrolyte, the material removed from the workpiece forms a flocculent solid material, hereinafter referred to as "sludge," which is carried away with the electrolyte. The mixture of sludge and electrolyte will hereinafter be referred to as "contaminated electrolyte." It is, of course, desirable to remove the sludge from the contaminated electrolyte which may be recycled in the electrolytic shaping process.

It has been discovered that reusable electrolyte is obtained by separating the sludge from the contaminated electrolyte with a centrifugal separator. Though plate and frame filters or the like employing cloth or other filtering means effectively remove the sludge from the contaminated electrolyte, they are rapidly filled with sludge and require frequent cumbersome cleaning. Centrifugal separators more efficiently effect this separation, generally have a larger capacity, and are easier to clean. Periodic cleaning of the centrifugal separator is, however, required; otherwise the sludge will overflow and contaminate the recovered electrolyte.

In the past, the sludge has been removed from the centrifugal separator when, upon visual inspection, it was determined that the centrifugal separator was nearly filled with sludge. This required a workman constantly to watch the centrifugal separator to determine when the sludge was to be removed.

It is an object of the present invention to provide a system whereby the cleaning of the centrifugal separator is automatically actuated without requiring a workman visually to inspect the centrifugal separator.

It is a further object of the present invention to provide an electrolytic shaping system wherein sludge formed during electrolytic shaping is automatically removed from the contaminated electrolyte to provide reusable electrolyte for the electrolytic shaping system.

It is a further object to provide an electrolytic shaping system wherein sludge formed during shaping is removed from the contaminated electrolyte by a centrifugal separator which is automatically cleaned to prevent contamination of recovered reusable electrolyte.

It is still another object of the present invention to provide an electrolytic shaping system wherein a centrifugal separator which separates sludge from contaminated electrolyte is automatically cleaned to prevent the recirculation of sludge in the system.

It is still another object of the invention to provide a system for recovering and reusing electrolyte in an electrolytic shaping process wherein the system has safety features which ensure a supply of electrolyte to the electrolytic shaping apparatus even if one of the components of the system should fail.

It is still a further object of the present invention to provide a storage tank for a system of recovering and reusing electrolyte in an electrolytic shaping process whereby a supply of electrolyte to the electrolytic shaping process may be maintained though parts of the system are not in operation.

The invention, both as to its organization and method of operation, together with further objects and advantages thereof, will best be understood by reference to the following description taken in conjunction with the accompanying drawing, in which The single figure is a schematic view of the electrolytic shaping and cavity sinking system of the present invention, wherein reusable electrolyte is recovered from contaminated electrolyte by an automatically cleaned centrifugal separator.

The system of this invention is adapted continuously to supply electrolyte to an electrolytic shaping apparatus, indicated generally by reference numeral 10, to withdraw contaminated electrolyte from the electrolytic shaping apparatus 10, and to remove the sludge from the contaminated electrolyte to provide reusable electrolyte which is recycled to the electrolytic shaping apparatus 10. The sludge is separated from the contaminated electrolyte by a centrifugal separator which is cleaned automatically to prevent sludge from recirculating in the system.

To these ends, the electrolytic shaping system of the present invention includes the electrolytic shaping apparatus 10, an electrolyte storage tank 12, a centrifugal separator 14, and an ampere hour meter 16. The storage tank 12 includes an electrolyte storage zone 18 for reusable and/or new electrolyte and a contaminated electrolyte storage zone 20. Contaminated electrolyte from the electrolytic shaping apparatus 10 passes to the contaminated electrolyte storage zone 20, from which it is withdrawn to the centrifugal separator 14, wherein the contaminated electrolyte is separated into sludge and reusable electrolyte. The recovered reusable electrolyte is passed to the electrolyte storage zone 18, from which it is withdrawn and pumped to the electrolytic shaping apparatus 10. The ampere hour meter 16 automatically terminates the flow of contaminated electrolyte to the centrifugal separator 14 and actuates the cleaning operation on the centrifugal separator 14 at the proper time. This prevents overflow of the sludge which would contaminate the electrolyte and eliminates the necessity for a workman to watch the centrifugal separator 14.

Considering the system in more detail, the electrolytic shaping and cavity sinking apparatus 10 is similar to that disclosed in the copending application of Lynn A. Williams Serial No. 73,154, filed September 2, 1960. It includes an axially movable ram 32 having a ram head 34 and an electrode holder 36 mounted thereon. An electrode 38 is secured by suitable means to the holder 36. A workpiece 40 is suitably secured to a work holder 42. The electrolytic shaping or cavity sinking is effected by simultaneously moving the electrode 38 toward the workpiece 40 while electrolyte is pumped under a pressure of up to 300 pounds per square inch or higher to and between the electrode 38 and workpiece 40, and a low potential (5 to 16 volts) high density (100 to 1000 amperes per square inch or higher) direct current is passed between the electrode 38 and the workpiece 40 in a sense to make the latter anodic. To these ends, the electrode 38 may be, but it is not necessarily, hollow and has a negative potential, the ram head 34 being connected to the negative line 44. (For convenience, the electrode 38 is considered to be of the hollow or tubular type.) The workpiece 40 is at a positive potential by virtue of work holder 42 being attached to the positive line 56. The lines 44 and 56 are in turn connected to the proper outlets of a power supply.

Electrolyte is supplied to the holder 36 and the interior of the hollow electrode 38 from the electrolyte storage zone 18. A pump and motor unit 54 withdraws the electrolyte from the electrolyte zone 18 through a pipe 52, and pumps it through a pipe 50 into the electrode holder 36 which internally forms a manifold chamber. The electrolyte is pumped through the electrode 38 to effect electrolytic shaping and/or cavity sinking upon the workpiece 40.

The electrolytic shaping or cavity sinking is effected in a work area defined by a pan 58 and a cover housing 60 which cooperate with one another to prevent electrolyte from splattering out of the work area. Suitable means, not shown, on the housing 60 provide access to the work area, these being described in more detail in copending application of Lynn A. Williams, Serial No. 73,154.

The electrolyte being pumped through the electrode 38 completes the circuit for electrolyzing current between the working face of the electrode 38 and the workpiece 40 to effect removal of metal from the workpiece 40. During the metal removal flocculent, solid material or sludge is formed and is carried away by the electrolyte which is constantly being pumped through the work gap. The mixture of sludge and electrolyte, i.e., contaminated electrolyte, collects in the pan 58 and is continuously withdrawn therefrom by a pipe 62 and directed to the contaminated electrolyte storage area 20 in the storage tank 12. The flow from the pan 58 to the storage area 20 is shown to be by gravity, but if necessary, the used electrolyte may be pumped to the storage area.

A baffle 64 separates the electrolyte storage zone 18 and the contaminated electrolyte storage zone 20 in the storage tank 12. For reasons more apparent hereinafter, the baffle 64 extends vertically to a height less than the height of an external wall 65 of the storage tank 12.

The contaminated electrolyte is withdrawn from the contaminated electrolyte zone 20 through a pipe 66 and pumped by a pump and motor unit 68 through a line 70 to the centrifugal separator 14, which includes an outer housing 74 having a rotatably mounted bowl or pot 74 therein. The bowl 74 is mounted upon a shaft 76 which is driven by a motor 78. The centrifugal separator 14 may be of any suitable type and does not constitute, per se, part of the present invention. The contaminated electrolyte is directed by the pipe 70 into the bottom portion of the bowl 74. The centrifugal force created by the rotation of the bowl 74 causes the contaminated electrolyte to line the wall of the bowl 74 and separate into a sludge layer 75 and an electrolyte layer 77, with the sludge layer 75 against the wall of the bowl 74. As the electrolyte layer 77 increases, reusable electrolyte from this layer flows over the lip of the bowl 74, as indicated by the arrows, and is collected in the bottom of the housing 72. The electrolyte recovered in the housing 72 is reusable in the electrolytic shaping apparatus 10 and is withdrawn from the housing 72 by a pipe 80 and passed to the electrolyte zone 18 in the storage tank 12. A pump, not shown, may be required to transfer the recovered electrolyte from the housing 72 to the electrolyte zone 18.

It has been discovered that the amount of metal removed and sludge formed during electrolytic shaping or cavity sinking is directly proportional to the amount of current flow between the electrode 38 and the workpiece 40 multiplied by the time of such flow. Therefore, mathematically the amount of metal removal and sludge formed is for most metals directly proportional to the integral of the current flow multiplied by time. This is measured by the ampere hour meter 16 which is electrically connected in the line 56. In this manner, knowing the sludge capacity of the centrifugal separator 14 and the amount of sludge formed during a predetermined number of ampere hours on a particular metal with a particular electrode, which may be determined by testing, the number of ampere hours which may be run before the sludge in the centrifugal separator 14 has accumulated sufficiently to require cleaning of the separator 14 may be readily determined. The ampere hour meter 16 is set accordingly to cause the centrifugal separator 14 to be cleaned after a predetermined number of ampere hours has occurred, i.e., when the amount of sludge formed would almost fill the separator 14 to its sludge capacity.

When this has occurred, the ampere hour meter 16, through suitable electrical controls or the like, indicated generally by the electrical connections 90 and 92, causes the pump and motor unit 68 to stop and actuates a skimmer 82, conventional cleaning means for the centrifugal separator 14. In this manner the flow of contaminated electrolyte to the centrifugal separator 14 is terminated and the sludge removed from the bowl 74 and passed to a sludge reservoir 88.

The skimmer 82 includes an air cylinder actuated rack and pinion arrangement, indicated generally by reference numeral 84, which moves the skimmer 82 slowly toward the wall of the bowl 74. The skimmer 72 extends into the sludge layer 75, whereby sludge is forced into the skimmer 82 and withdrawn from the bowl 74 to the reservoir 88 through the pipe 86. During the cleaning period the bowl 74 continues to rotate, whereby the sludge layer 75 is diminished until substantially all of it has been removed from the bowl 74. When the sludge has been removed from the bowl 74, a limit switch or the like actuates suitable means (not shown) automatically to reset the ampere hour meter 16, move the skimmer 82 back to its original position by means not shown, and start the pump 68, whereby the cycle is repeated.

The baffle 64 which separates the electrolyte storage zone 18 and the contaminated electrolyte zone 20 affords certain safety features in the system of the present invention. If, for example, the pump and motor unit 68 should fail or malfunction, contaminated electrolyte would not be delivered to the centrifugal separator 14. As a result, reusable electrolyte would not be delivered to the electrolyte zone 18 from the separator 14, and the supply of the electrolyte in the zone 18 would soon be exhausted. In the meantime, however, contaminated electrolyte accumulates in the contaminated electrolyte zone 20. However, instead of overflowing the tank 12, the baffle 64 allows the contaminated electrolyte to overflow into the electrolyte zone 18. Though it is not generally desirable for this to occur, in this instance it is beneficial, as the contaminated electrolyte will be sent to the electrolytic shaping apparatus 10 and assure that it has electrolyte which is essential to its operation. The shaping apparatus 10 will operate on contaminated electrolyte, though it is not as effective as the purified electrolyte obtained from the separator 14. Therefore, should the pump and motor unit fail, the baffle 64 insures that there will be sufficient electrolyte in the clean electrolyte zone 18 to supply electrolyte to the electrolytic shaping apparatus 10.

In addition, if the electrolytic shaping apparatus 10 is not in operation, for example when the workpiece 40 is being replaced, reusable electrolyte will continue to be formed in the separator 14 and will accumulate in the clean electrolyte zone 18. If the electrolytic apparatus 10 is shut down long enough, electrolyte will accumulate and fill the electrolyte zone 18. However, instead of overflowing the storage tank 12, any overflow of electrolyte in this instance would be over the baffle 64 and into the contaminated electrolyte zone 20. In this manner the reusable electrolyte is recycled from the contaminated electrolyte zone 20 through the centrifugal separator 14 back to the electrolyte zone 18 until the electrolytic shaping apparatus 10 is back in operation.

Furthermore, if the cleaning step effected by the skimmer 82 should take longer than anticipated, or is for some reason delayed, since the pump and motor unit 68 is no longer operating, contaminated electrolyte will accumulate in the contaminated electrolyte zone 20. The baffle 64 prevents the otherwise harmful overflow which might occur in the same manner discussed hereinbefore with respect to the situation where the unit 68 malfunctions.

Lastly, should the contaminated electrolyte from the work area fail to reach the contaminated electrolyte zone 20 for some reason, for example, the pipe 62 leaks or is disconnected, the electrolyte zone 18 will continue to supply clean electrolyte to the shaping apparatus 10 until its supply is exhausted. It will be understood that any contaminated electrolyte which might be in the zone 20 would be purified in the separator 14 and delivered to the electrolyte zone 18, thereby providing more available electrolyte for the shaping apparatus 10. In this manner, sufficient electrolyte is generally available in the present system to afford sufficient time to remedy the problem.

It will be understood that any electrolytic shaping or cavity sinking apparatus may be employed in the system of the present invention, and that the apparatus disclosed in the aforesaid copending application Serial No. 73,154, and discussed herein with respect to the system of the present invention, is merely exemplary of such means.

Furthermore, it will be understood that any type of ampere hour meter or the like may be employed in the present invention, and that the selection of a suitable meter would be within the skill of one in the art.

While the embodiment described herein is at present considered to be preferred, it will be understood that various modifications and improvements may be made therein, and it is intended to cover in the appended claims all such modifications and improvements as may fall within the true spirit and scope of the invention.

What is desired to be claimed and secured by Letters Patent of the United States is:

1. A system for recovering and recycling electrolyte from a mixture of electrolyte and sludge produced during the operation of an electrolytic apparatus for removing material from an electrically conductive and electrochemically erodible workpiece, said apparatus including an electrode which acts upon a workpiece by the cooperative action of current and electrolyte flow between said electrode and the workpiece, said system comprising in combination, means to recover said mixture of sludge and electrolyte, a centrifugal separator, means to convey said mixture to said centrifugal separator wherein the sludge and electrolyte are separated, means to recycle the recovered electrolyte to said electrolytic material removal apparatus, means to measure the ampere hours effected by current flow between said electrode and the workpiece, and means actuated by said ampere hour measuring means to clean said separator of sludge, whereby said separator is cleaned of sludge after a predetermined number of ampere hours.

2. The system of claim 1, including first means to store said mixture from said electrolytic material removal apparatus, means to withdraw said mixture from said first storage means, second means to store said electrolyte recovered from said separator, and means to pump said electrolyte from said second storage means to said electrolytic material removal apparatus.

3. A system for recovering and recycling electrolyte from a mixture of electrolyte and sludge produced during the operation of an electrolytic material removal apparatus for removing material from an electrically conductive and electrochemically erodible workpiece, said apparatus including an electrode, and separate means for passing electrolyte and an electrolyzing current between said electrode and the workpiece, said system comprising in combination, means to recover the mixture of sludge and electrolyte, means to convey the mixture to a first electrolyte zone in a storage tank, a centrifugal separator, a first pump means to convey the mixture from said first electrolyte zone to said centrifugal separator wherein the sludge and electrolyte are separated, means to convey the recovered electrolyte to a second electrolyte zone in said storage tank, means to recycle the recovered electrolyte to said electrolytic material removal apparatus from said second electrolyte zone, means to measure the ampere hours effected by current flow between said electrode and the workpiece, and control means actuated by said measuring means after a predetermined number of ampere hours to cause said first pump means to stop, the sludge to be removed from said separator, and said first pump means started again.

4. The system of claim 3, wherein said storage tank has an exterior wall, said first and second electrolyte zones in said storage tank are separated by a baffle in said storage tank whereby electrolyte from either zone will overflow into the other zone over the baffle before overflowing said exterior wall.

References Cited by the Examiner
UNITED STATES PATENTS 2,895,814  7/1959  Clark _____ 204—143
2,939,825  6/1960  Faust et al. _____ 204—143

FOREIGN PATENTS 335,003  9/1930  Great Britain.

JOHN H. MACK, *Primary Examiner.*